No. 822,764. PATENTED JUNE 5, 1906.
J. W. PAYNE.
PRUNING IMPLEMENT.
APPLICATION FILED APR. 19, 1905.

Witnesses

Inventor
J. W. Payne
By
Attorney

UNITED STATES PATENT OFFICE.

JOHN W. PAYNE, OF ELBA, VIRGINIA.

PRUNING IMPLEMENT.

No. 822,764.   Specification of Letters Patent.   Patented June 5, 1906.

Application filed April 19, 1905. Serial No. 256,445.

*To all whom it may concern:*

Be it known that I, JOHN W. PAYNE, a citizen of the United States, residing at Elba, in the county of Pittsylvania, State of Virginia, have invented certain new and useful Improvements in Pruning Implements; and I do hereby declare the following to be a full, clear, and exact description of the invention, such as will enable others skilled in the art to which it appertains to make and use the same.

This invention relates to pruning implements.

One object of the invention is to provide an exceedingly simple, inexpensive, durable, and efficient pruning implement whereby stalks may be easily relieved of leaves, suckers, &c.

Another object of the invention resides in the provision of a pruning implement having blades pivoted together and normally spaced apart at their ends, corresponding ends of the blades being provided with handles and the opposite or free end of each blade being correspondingly bent or otherwise formed to embrace the stalk.

With these and other objects in view the present invention consists in the novel construction, combination, and arrangement of parts, as will be hereinafter more fully described, shown in the accompanying drawings, and particularly pointed out in the appended claims.

Figure 1:
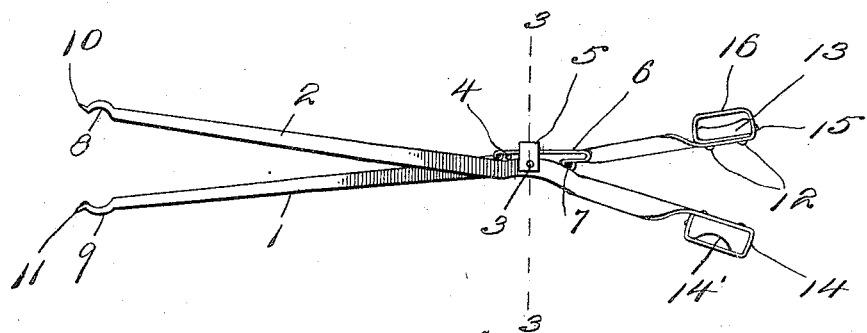
Figure 2:
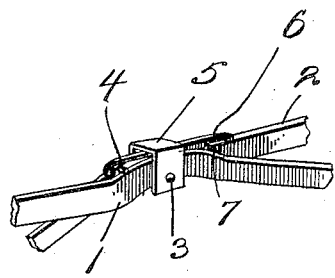
Figure 3:
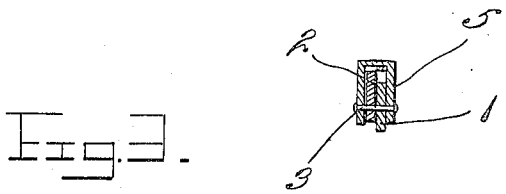

In the accompanying drawings, Figure 1 is an elevation of the invention. Fig. 2 is an enlarged detail perspective view of the yoke arranged at the pivotal connection of the blades. Fig. 3 is a sectional view on the line *a a* of Fig. 1.

Referring now more particularly to the accompanying drawings, the reference characters 1 and 2 designate blades pivoted together intermediate their ends by means of a pivot-pin 3, there being a stop 4 arranged upon the inner face of the blade 1 slightly beneath the pivot-pin 3 to limit the outward movement of the free ends of the blades with respect one to the other. Embracing the outer sides of the blades 1 and 2 at their pivotal point is a yoke 5, through which the pivot-pin 3 passes, there being a flat spring 6 connected at one of its ends and bearing against the inner surface of the bight of the yoke and then downwardly at its upper end for engagement with the pin 7. This spring serves to hold the blades normally separated at their ends, the lower ends of the blades having semicircular bends 8 and 9, respectively, in their lower ends, which semicircular bends form a circular opening for engagement and embracing action upon the stalk (not shown) to clean the latter of leaves and other matter, the extremities of each lower end of the blades 1 and 2 being pointed and turned outwardly, as indicated at 10 and 11, respectively.

It will be observed that the upper end of the blade 1 is twisted somewhat and secured by means of rivets or the like 12, and secured on the outer face of the extremity thereof is a wooden or other block 13, whose side edges are rounded and whose outer face is concaved to form a smooth and hollow surface for the reception of the fingers of the hand, the loop 14 at the upper extremity of the blade 2 being provided with a thumb-hole 14. As a further means for accommodating the fingers of one's hand and preventing slipping of the latter from the gripping-surface 13 a strap is secured at one of its ends, by means of suitable elements 15, to the outer end of the wooden block 13, the opposite end of the strap or other flexible connection 16 being disposed between the under surface of the block 15 and the outer flat surface of the blade 1, one of the rivets or the like 12 piercing the strap or other flexible connection 16 at the same time that it is passed through the blade 1 and the wooden hand-grip 3.

It will be observed that the blades 1 and 2 are bent peculiarly intermediate their ends at their point of pivotal engagement with each other, the outer edge of the blade 2 resting normally against the stop 4, the spring, as already stated, serving to hold the free ends of the blades away from each other. Now since the free ends of the blades are normally spaced they may be passed up on the sides of a stalk, and by reason of the peculiar formation of the blades an inward movement of the hand upon the upper ends of the blades will cause the inward movement of the lower ends thereof, permitting of a scraping of the stalk, as should now be well understood. By reason of the pointed ends 10 and 11 of the blades 8 and 9 plants may be cultivated or treated by making an incision therein or by loosening the ground therearound.

What is claimed is—

1. A pruning implement comprising blades pivoted together intermediate their ends, a stop upon one of the blades to limit the outward movement of the lower ends of the blades with respect to each other, a yoke embracing the pivotal connection of the blades, a spring associated with said stop, a yoke on one of the blades, and hand-grips provided at one end of the implement.

2. A pruning implement comprising blades pivoted together intermediate their ends and provided with grasping elements at one end, the opposite ends of the blades being provided with bends, a stop disposed upon one of the blades to limit the movement of separation of the bent ends thereof, a yoke embracing the blades at their pivotal connection, and a spring connected to the said stop and passed between the yoke and engaged at its opposite end to one of the blades.

In testimony whereof I affix my signature in presence of two witnesses.

JOHN W. PAYNE.

Witnesses:
W. C. KEATS,
W. D. LOVE.